(12) United States Patent
Chen (10) Patent No.: US 9,797,236 B2
(45) Date of Patent: Oct. 24, 2017

(54) LOGGING WHILE DRILLING ELECTRICAL IMAGER AND METHOD FOR MEASUREMENT IN OIL BASED MUD

(71) Applicant: Weatherford/Lamb, Inc., Houston, TX (US)

(72) Inventor: Jiefu Chen, Cypress, TX (US)

(73) Assignee: Weatherford Technology Holdings, LLC, Houston, TX (US)

( * ) Notice: Subject to any disclaimer, the term of this patent is extended or adjusted under 35 U.S.C. 154(b) by 590 days.

(21) Appl. No.: 14/305,227

(22) Filed: Jun. 16, 2014

(65) Prior Publication Data

US 2015/0361780 A1 Dec. 17, 2015

(51) Int. Cl.
*G01V 3/00* (2006.01)
*E21B 47/00* (2012.01)

(52) U.S. Cl.
CPC ................................ *E21B 47/0002* (2013.01)

(58) Field of Classification Search
CPC ... G01V 3/18; G01V 3/34; G01V 3/38; G01V 1/52; G01V 5/04; E21B 47/00; E21B 4/02; E21B 7/062
USPC ................ 324/366, 333, 334, 338, 339, 346
See application file for complete search history.

(56) References Cited

U.S. PATENT DOCUMENTS

| | | | | |
|---|---|---|---|---|
| 4,525,715 A | * | 6/1985 | Smith | E21B 47/122 175/50 |
| 6,580,268 B2 | * | 6/2003 | Wolodko | E21B 47/0008 324/227 |
| 6,765,385 B2 | * | 7/2004 | Sinclair | G01V 3/30 324/338 |
| 7,755,361 B2 | * | 7/2010 | Seydoux | G01V 3/28 324/333 |
| 8,049,508 B2 | * | 11/2011 | Gorek | G01V 3/28 324/338 |
| 2014/0306711 A1 | * | 10/2014 | Hu | G01V 3/20 324/367 |

FOREIGN PATENT DOCUMENTS

| | | |
|---|---|---|
| CA | 2651097 A1 | 11/2007 |
| CN | 203161203 U | 8/2013 |
| GB | 2400670 A | 10/2004 |
| GB | 2407641 A | 5/2005 |
| WO | 2005/078481 A1 | 8/2005 |
| WO | 2012/037340 A1 | 3/2012 |

OTHER PUBLICATIONS

Combined Search and Examination Report in counterpart UK App. GB1510581.0, dated Nov. 24, 2015.
First Office Action in counterpart Canadian App. 2,894,322, dated Jun. 1, 2016, 3-pgs.

* cited by examiner

*Primary Examiner* — Giovanni Astacio-Oquendo
(74) *Attorney, Agent, or Firm* — Blank Rome LLP (57) ABSTRACT

A method and apparatus for generating a borehole image by firing a signal in the direction of a borehole formation using at least one transmitter in a horizontal array, firing a signal in the direction of the borehole formation using at least one transmitter in a vertical array, where the fired signals engage the downhole formation, receiving signals associated with the transmitted signals after the fired signals have engaged the formation, and using the received signals to determine one or more vertical and horizontal formation parameters for generating an omni-directional image using the formation parameters.

32 Claims, 10 Drawing Sheets

(prior art)

LOGGING WHILE DRILLING ELECTRICAL IMAGER AND METHOD FOR MEASUREMENT IN OIL BASED MUD

BACKGROUND OF THE DISCLOSURE

During the exploration of oil and gas, electromagnetic (EM) logging tools are commonly used for the determination of electrical properties of formations. Electrical imagers within wireline tools and Logging While Drilling (LWD) tools have typically both been used to give measurements of the attenuation and phase difference of a formation downhole. However, current imaging tools lack true omni-directional sensitivity and thus fail to accurately represent images in both horizontal and vertical planes of reference.

Aperture antennas may be used as transmitters and receivers in oil based mud and may be used to produce images of a formation downhole. However, images generated using aperture antennas are typically polarized (i.e., have directionality) and cannot provide omni-directional sensitivity. Also, based on design and orientation of imagers using aperture antennas, the signal strength and image resolution of these electrical imagers may be limited.

Another limitation of many electrical imagers is that they cannot operate in oil based muds. Due to the non-conductive nature of some oil based muds, measurements downhole using some electrical imagers may be inhibited. As a result, having the ability to operate in an oil based mud environment is one advantage some electrical imagers have over others. For example, galvanic type electric imagers do not work in oil based muds because they exhibit very low conductivity in such environments. Also, operating electrical imagers with higher frequencies (in the range of hundreds of Megahertz to Gigahertz) may be necessary for imaging in oil based mud.

Figure 1A:
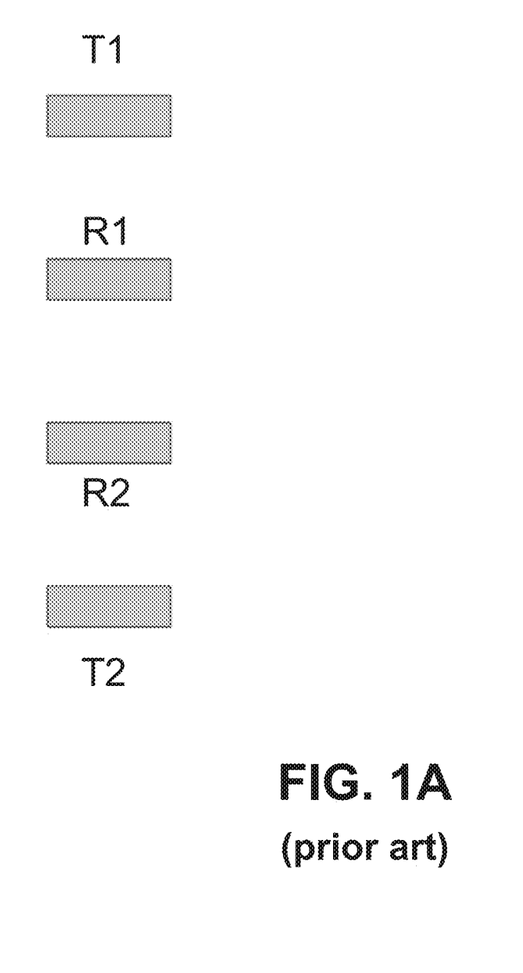
FIG. 1A illustrates an electrical imager configuration according to the prior art.
Figure 2A:
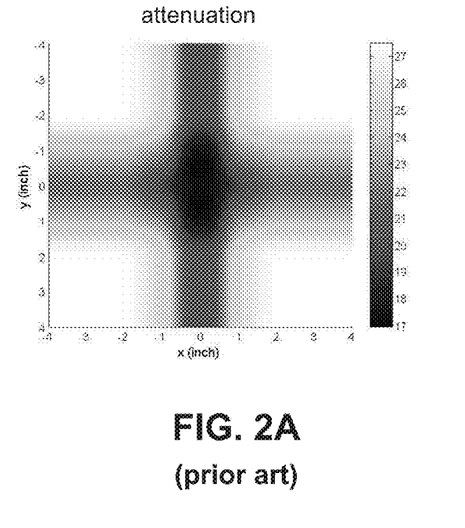
FIG. 2A illustrates an image of the attenuation of vertical and horizontal fractures in a formation using an electrical imager having two transmitters and two receivers downhole according to the prior art.
Figure 2B:
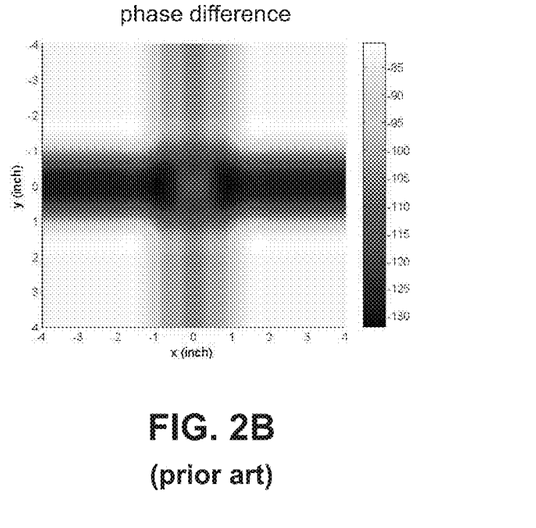
FIG. 2B illustrates an image of the phase difference of vertical and horizontal fractures in a formation downhole using an electrical imager having two transmitters and two receivers according to the prior art.

FIG. 1A illustrates an electrical imager configuration according to the prior art. The imager consists of an array of two transmitters and two receivers sharing a similar size and being oriented in a one dimensional array. These transmitters and receivers are used to transmit high-frequency electrical signals into a formation and receive the reflection of the transmitted signals for imaging. Referring to FIGS. 2A and 2B however, when imaging the phase and attenuation of a formation downhole using the imager as discussed above, the imager fails to accurately represent the resolution of formation fractures in both the horizontal and vertical directions. FIG. 2A illustrates an image of the attenuation of vertical and horizontal fractures downhole having equal widths, whereas FIG. 2B illustrates an image of the phase difference of the vertical and horizontal fractures in the formation.

As illustrated in FIG. 2A, when measuring the attenuation of the formation downhole using the electrical imager configuration above, the fractures in the vertical direction (vertical fracture) appear darker than the image of the fractures in the horizontal direction (horizontal fracture). Because the fractures in the formation have equal widths, the contrast of the vertical fracture and the contrast of the horizontal fracture should be the same. Thus, imagers in the art may not accurately represent the fractures in a foundation adequately. As a result, the data from these imagers may be misleading.

Referring to FIG. 2B, an image of the phase difference of the formation is shown. As shown, the horizontal fracture is shown to be substantially darker than the vertical fracture. As discussed above, because the fractures have the same width, the contrast of the vertical fracture and the horizontal fracture should be the same. In true omni-directional imaging, contrasts representing fractures in a formation are accurately represented.

Also, current imagers lack the ability to provide a quantitative analysis of the resistivity and dielectric constant of a formation downhole. By measuring the resistivity and dielectric constant of a formation, geologists and petrophysicists can more accurately evaluate formation parameters such as permeable layers, water and/or oil reservoirs, fractures, strike angles and/or dipping angles, etc. Current imaging tools are mostly limited to imaging and cannot provide both high resolution imaging and a quantitative analysis of formation resistivity and dielectric constant.

It is therefore desirable to have an electrical imager system and method for creating, an omni-directional, high resolution image of the parameters of a downhole formation such as the phase difference and attenuation in oil based mud, while also being capable of providing a quantitative analysis of formation resistivity and dielectric constant.

The subject matter of the present disclosure is directed to overcoming, or at least reducing the effects of, one or more of the problems set forth above.

SUMMARY OF THE DISCLOSURE

The present disclosure provides a method and apparatus for generating an image of a downhole formation by firing a signal in the direction of a downhole formation using at least one transmitter in a horizontal array, firing a signal in the direction of the formation using at least one transmitter in a vertical array, where the fired signals engage the downhole formation, receiving signals associated with the fired signals after the fired signals have engaged the formation, and using the received signals to determine one or more vertical and horizontal formation parameters for generating an omni-directional image using the formation parameters.

Other embodiments provide a method and apparatus for using at least one transmitter in either a vertical or horizontal array to fire signals in the direction of a downhole formation, where the fired signals engage the downhole formation, and receiving signals associated with the fired signals after the fired signals have engaged the downhole formation, wherein the received signals represent quantitative formation data and are used to determine one or more vertical or horizontal quantitative formation parameters.

The foregoing summary is not intended to summarize each potential embodiment or every aspect of the present disclosure.

DETAILED DESCRIPTION OF THE DISCLOSURE

As discussed in reference to FIGS. 1A-2B, current imager designs are typically composed of a single array, having no significant size difference or orientation with respect to transmitters and receivers. By enlarging the aperture of the transmitter and by having a compact orientation of the receivers, the resolution of the imager may be increased.

Figure 3A:
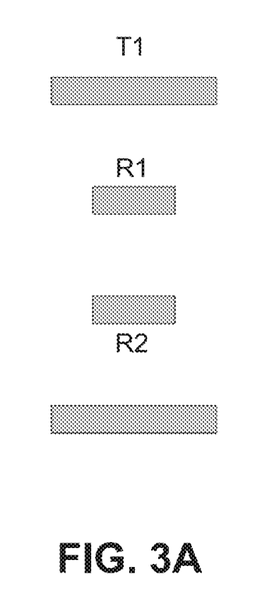
FIG. 3A illustrates an electrical imager configuration having widened transmitter apertures according to the present disclosure.

As illustrated in FIG. 3A, the electrical imager has a plurality of transmitters (T1 and T2) and receivers (R1 and R2) for transmitting high frequency (e.g., hundreds of megahertz to up to one or more gigahertz) electrical signals into a formation downhole and receiving the transmitted signals. The received signals are subsequently processed downhole or at the surface using a surface processor (not shown) in order to process quantitative data of the formation (e.g., resistivity and/or dielectric constant) and/or provide representative images of formation properties downhole. The electrical imager may work in water based or oil based mud.

FIG. 3A further illustrates an electrical imager configuration having widened transmitter apertures according to the present disclosure. As illustrated, the openings or apertures of the transmitters T1 and T2 have an increased size. By deploying transmitters having larger apertures, the transmitters can transmit stronger signals for engaging the subsurface wall while also reducing the reflection of the transmitted signal. This is because, as the cross-section of the transmitter apertures (e.g., waveguide antennas T1 and T2 gets larger, the permittivity of the material filled inside the transmitters will be lower. This will result in a smaller permittivity contrast between the material inside of the transmitter and the oil based mud outside of the transmitter. As a result, any unwanted wave reflection will be minimized-which will result in more signal/energy engaging (i.e., transmitted into) the mud and the formation.

Figure 3B:
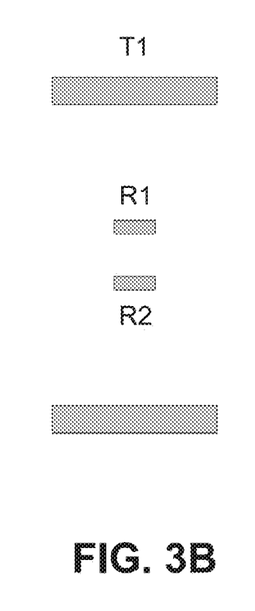
FIG. 3B illustrates an electrical imager configuration having widened transmitter apertures and compact receivers according to the present disclosure.

Referring to FIG. 3B, the electrical imager configuration of FIG. 3A having widened transmitter apertures is shown while also incorporating a more compact receiver array. By incorporating receivers (R1 and R2) that are closer to one another (i.e. more compact), the electrical imager will produce a higher-resolution image. Although this disclosure is not limited to a particular type of antenna used for transmitting and/or receiving, any antenna having widened apertures may be used.

Figure 4A:
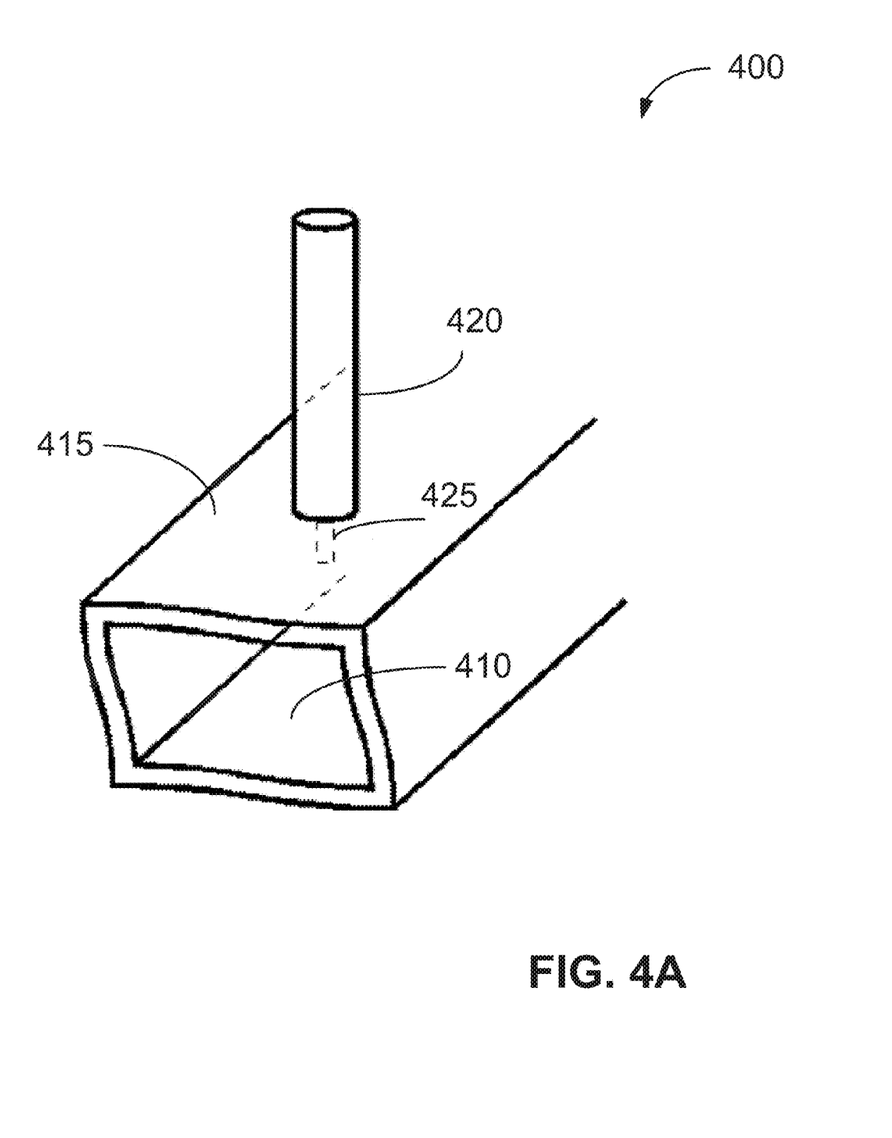
FIG. 4A illustrates an open ended waveguide antenna element according to the present disclosure.

Referring to FIG. 4A, an open-ended waveguide antenna element 400 having a widened aperture is shown. As described above, different antenna designs may be used to implement the system and method described. As illustrated, open-ended waveguide antenna elements 400 may include a waveguide 415 that terminates with a widened opening or hollow center 410. As discussed above, although antenna elements 400 may either be transmitters or receivers, transmitters having widened apertures 410 will allow the imager to produce stronger signals and reduce signal reflection. Referring to the open-ended waveguide antenna 400 shown in FIG. 4A, the antenna element 400 may further have a coax feeder 420 that connects to the waveguide 415 and feeds a coax inner conductor 425 into the waveguide 415 from the coax feeder 420. This will effectively allow communication with the waveguide antennas while the antennas are disposed downhole.

Figure 4B:
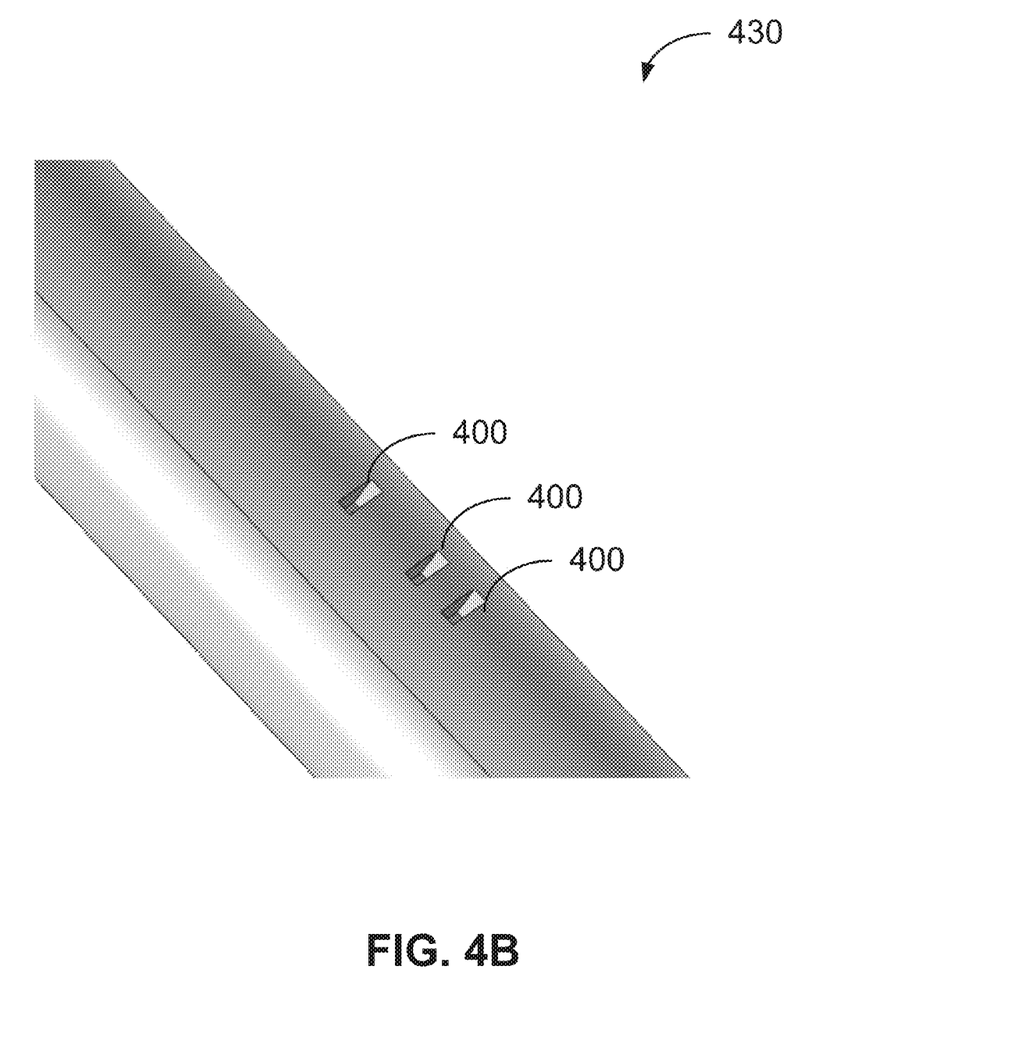
FIG. 4B illustrates antenna elements disposed in a downhole tool.

Referring now to FIG. 4B, multiple antenna elements 400 are shown disposed in a downhole tool 430. The downhole tool 430 is shown having three antennas 400 disposed therein, in an array along the major axis of the tool. Although the antenna elements 400 are shown disposed along the top side of the downhole tool 430, the antenna elements 400 may be disposed on any side of the downhole tool 430.

Also, the openings (410) of the antenna elements 400 are filled with an epoxy or other non-conducting filler. The epoxy serves to protect the antenna elements 400 during logging while drilling operations. Further, the shape of the horn antenna elements are not limited to having a rectangular aperture, as different designs may be incorporated.

Now that the orientations for the transmitters and receivers of the electrical imager have been discussed, the imager design having omni-directional imaging with enhanced transmission and imaging resolution will be described.

Figure 5:
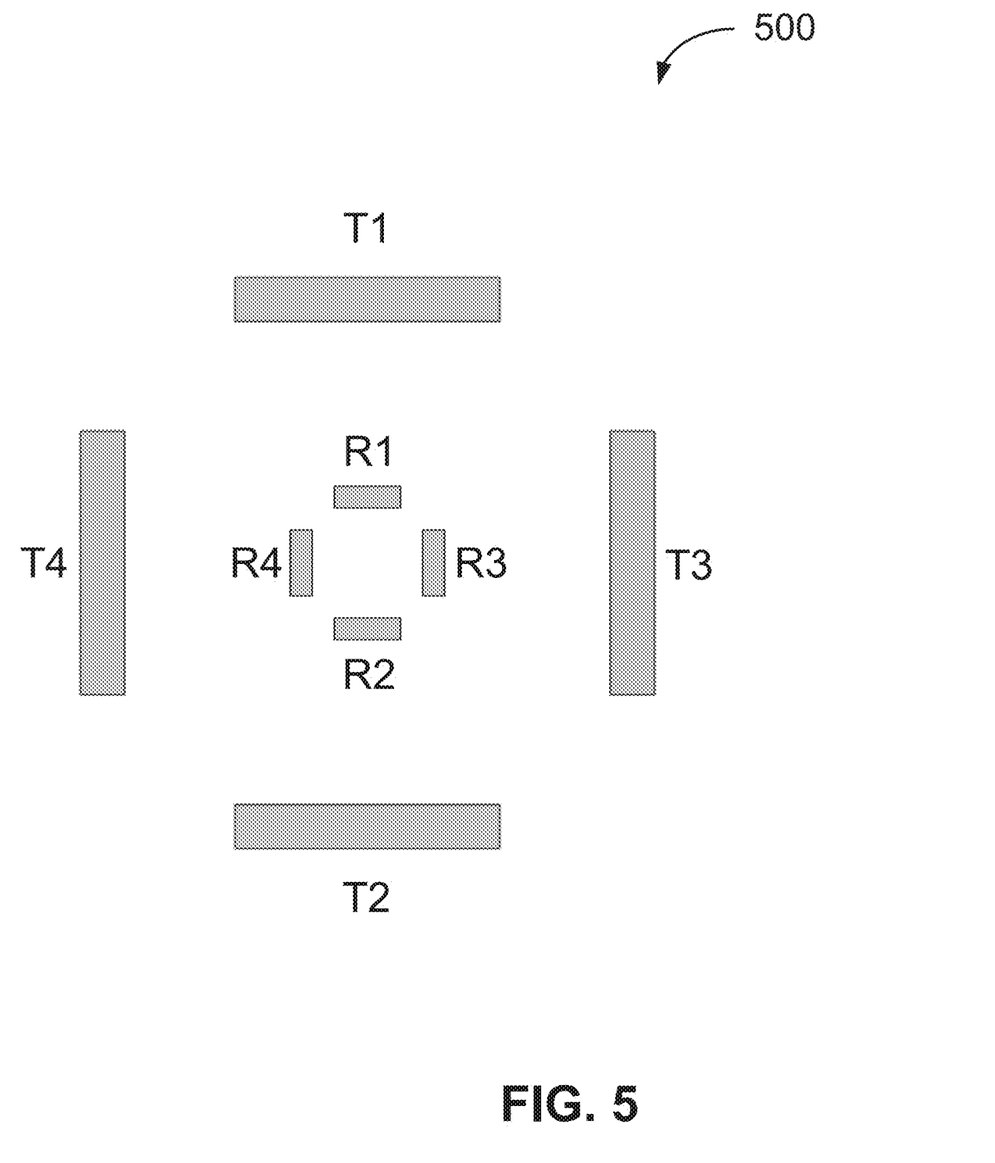
FIG. 5 illustrates an electrical imager configuration according to the present disclosure.

FIG. 5 illustrates an electrical imager 500 configuration according to the present disclosure. As shown, the imager 500 has an antenna configuration consisting of antenna arrays in the vertical direction (i.e., T1, T2, R1 and R2) and the horizontal direction (i.e., T3, T4, R3 and R4). As will be explained in further detail below, having a dual-directional transmitter/receiver antenna configuration will allow the imager 500 to take dual compensation measurements of the formation and use the measurements to create an omnidirectional image of fractures within the formation.

The computations for determining the compensated voltage, attenuation, and phase difference along the vertical and horizontal planes of a formation are shown below:

$$V_{comp} = \frac{V_{T1R1}}{V_{T1R2}} \cdot \frac{V_{T2R2}}{V_{T2R1}} \cdot \frac{V_{T3R3}}{V_{T3R4}} \cdot \frac{V_{T4R4}}{V_{T4R3}}, AT = 20 \cdot \log_{10}(|V_{comp}|),$$

$$PD = \text{ATAN2}(\text{imag}(V_{comp}), \text{real}(V_{comp}))$$

As shown, the voltage compensation (Vcomp) for transmitters T1-T4 and receivers R1-R4, can be used to determine the attenuation and phase difference of the formation. The attenuation and phase difference can subsequently be used for producing high resolution images in both the vertical and horizontal planes of reference.

Referring again to the orientation of the imager 500 in FIG. 5, the receivers R1-R4 are positioned close to one another for increased imaging resolution. For optimal results, the receivers R1-R4 may be separated between 6 cm to within 3 cm of each other for increased resolution. The displacement of the receivers with respect to one another may however be outside of this range.

Transmitters T1-T4 are also shown around (i.e., surrounding) the compact receiver group R1-R4 and can be used to transmit signals into the formation downhole, and the signals received by receivers R1-R4 may be used for creating a omnidirectional picture of the phase and attenuation of the formation downhole.

After having discussed the design and orientation of the antenna elements 400 of the omni-directional imager 500, we refer now to representative images generated using the electrical imager 500 according to the present disclosure. The images produced illustrate a formation having fractures of equal widths in both vertical and horizontal planes. Referring to the image in FIG. 6, an image of the attenuation of vertical and horizontal fractures in a formation is shown using an electrical imager having four transmitters and four receivers according to the present disclosure.

Figure 6:
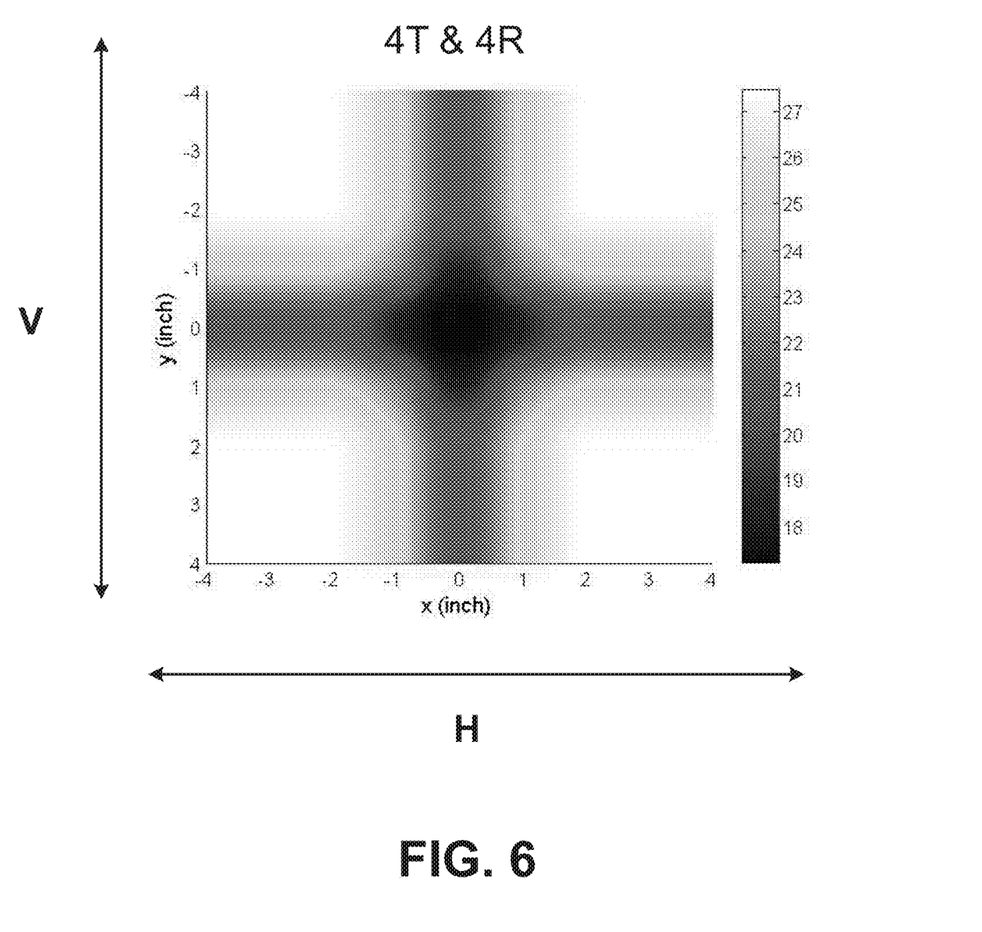
FIG. 6 illustrates an image of the attenuation of vertical and horizontal fractures in a formation downhole using an electrical imager having four transmitters and four receivers according to the present disclosure.

As shown, using the compensated voltage Vcomp of the four transmitters T1-T4 and four receivers R1-R4 of the imager, the attenuation of the formation can be seen clearly in both the horizontal (H) and vertical (V) planes. Because of the omni-directional design of the imager, both fractures within the formation along the horizontal H and vertical V axes can be seen as dark lines.

Figure 7:
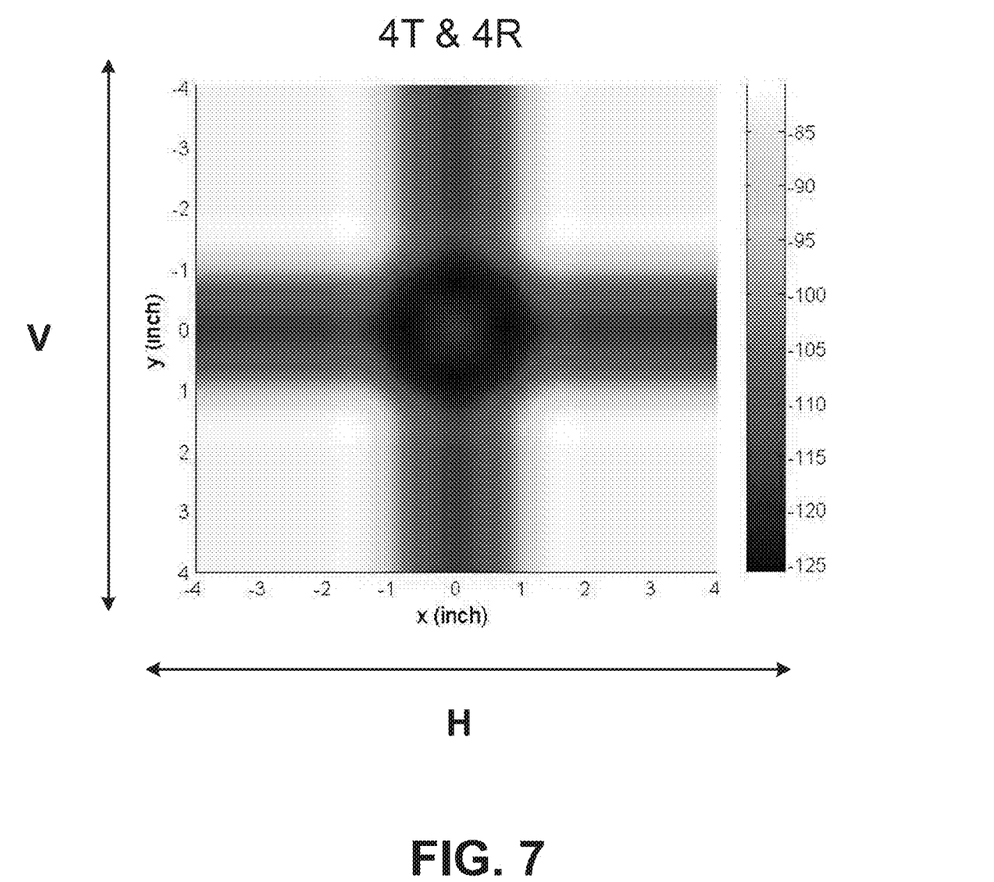
FIG. 7 illustrates an image of the phase difference of vertical and horizontal fractures in a formation downhole using an electrical imager having four transmitters and four receivers according to the present disclosure.

Likewise, FIG. 7 illustrates an image of the phase difference of the vertical V and horizontal H fractures in the formation using the electrical imager 500 having four transmitters and four receivers according to the present disclosure. As shown, the representative image shows the vertical and horizontal lines having similar contrast or intensity. This information accurately indicates that the representative formation has fractures of equal widths in both the horizontal H and vertical V planes.

Because the imager 500 can present omni-directional information, the information will be more accurate than information received from imagers having only two transmitters and two receivers. This is because the information more accurately represents attenuation and phase difference of formation fractures in each plane of reference.

Figure 8A:
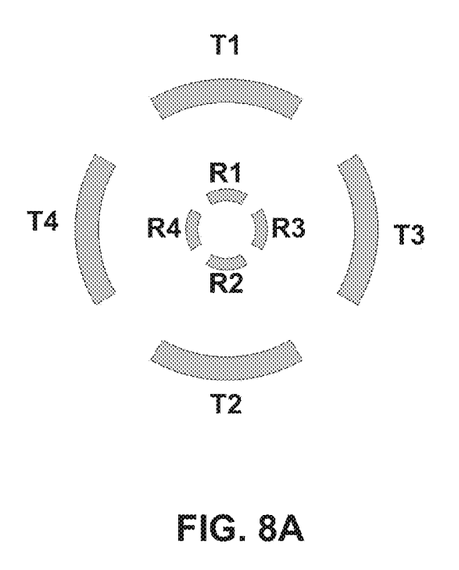
FIG. 8A illustrates an alternative configuration of an electrical imager configuration having curved transmitters and receivers.
Figure 8B:
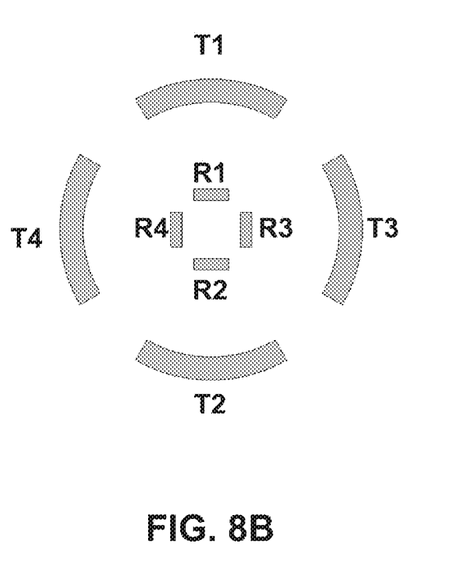
FIG. 8B illustrates an alternative configuration of an electrical imager configuration having curved transmitters.

In another aspect of the invention, because most LWD tools are cylindrical in nature it may be desired to design the shape of the transmitters and/or receivers to the shape of the LWD tool. As shown in FIG. 8A transmitters T1-T4 and receivers R1-R4 all have a curved shape to their design. The curved design will enhance imager placement uniformity with the LWD tool. The curved design will also enable more of the transmitted signal to be directed to target area, thereby enhancing measurement. FIG. 8B likewise illustrates transmitters T1-T4 having curved apertures. However, because receivers R1-R4 are oriented in a compact surface area, having a curved receiver apertures may not necessarily enhance measurement resolution, and therefore may not be desired.

So far, the discussion has been directed to imaging aspects of the electrical imager 500. However, the electrical imager 500 presently disclosed may also provide high resolution quantitative bedding analysis of formation resistivity and dielectric constant. The design shown in FIG. 5 having transmitters (T1 T2 T3 T4) and receivers (R1 R2 R3 R4) may only be designed for qualitatively resolving features on the formation wall (i.e. generating formation wall images), and may not be designed for quantitative formation analysis (i.e. the inversion of formation resistivity and dielectric constant). Further, for imaging purposes, the imager may be designed differently so that it is very sensitive to local/shallow variations on the formation wall. In this aspect, the imager's receivers may be designed to be close to each other.

However, having short spacing between the receivers may lead to the imager having a very short depth of investigation (DOI) of measurement, and may cause the imager to lack the ability to interrogate the true formation behind the oil based mud and the formation wall. By adding T5 and T6, and changing T1/T2 to R5/R6, the imager may be designed to have a much larger spacing between receivers, and consequently much deeper DOI. Measurements using this design may be less sensitive to local/shallow variations of the formation wall, and may be more suitable for quantitative analyses of the formation parameters such as resistivity and dielectric constant.

Figure 9:
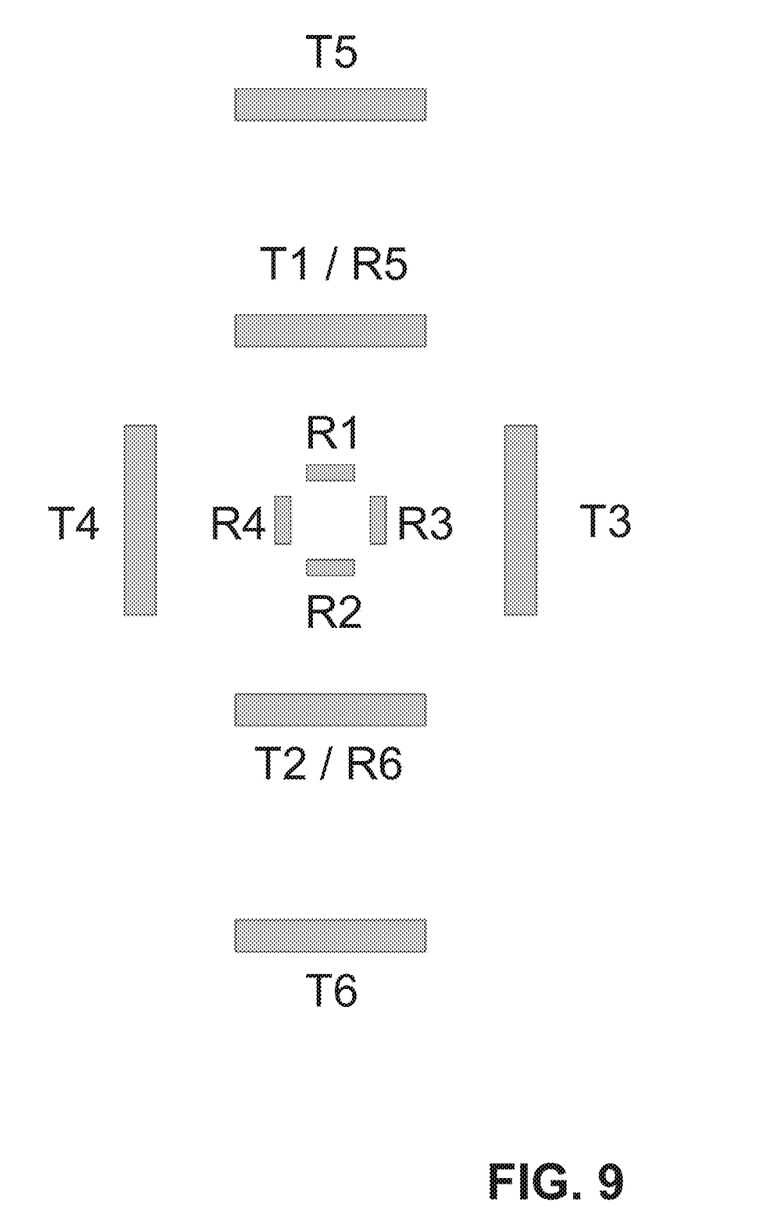
FIG. 9 illustrates an alternative configuration of an electrical imager configuration.

As shown in FIG. 9, an alternative configuration of an electrical imager 500 being capable of providing a quantitative analysis of a formation is shown. The imager 500 design includes two additional transmitters T5 and T6, and when the design is oriented for quantitatively analyzing the resistivity and dielectric constant, transmitters T1 and T2 (as previously discussed) can be interchanged for receivers R5 and R6.

Using the alternative design of FIG. 9, the received signals may be subsequently processed downhole or at the surface using a surface processor (not shown) in order to process quantitative data of the formation (e.g., resistivity and/or dielectric constant). However, when the design is not oriented for quantitatively analyzing the resistivity and dielectric constant of the formation, transmitters T1 and T2 may be again used with receivers R1 and R2 for providing representative images of formation properties downhole.

The equation for determining the compensated voltage Vcomp for providing a quantitative analysis of the formation is shown below:

$$V_{comp} = \frac{V_{T5R5}}{V_{T5R6}} \cdot \frac{V_{T6R6}}{V_{T6R5}}, AT = 20 \cdot \log_{10}(|V_{comp}|),$$

$$PD = \text{ATAN2}(\text{imag}(V_{comp}), \text{real}(V_{comp}))$$

As shown, the Vcomp determined from transmitters T5 and T6 and receivers R5 and R6 can be used to determine the attenuation and phase difference of the formation.

After these measurements are obtained, they may be used for determining the resistivity and dielectric constant of the formation using techniques as known in the art. As described above, any of the illustrated antenna elements disclosed may have different orientations or designs, and are not limited to the illustrations herein.

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:
1. A method for generating a downhole image, comprising:

firing, using at least one transmitter in a horizontal array, a signal in the direction of a downhole formation;

firing, using at least one transmitter in a vertical array, a signal in the direction of the downhole formation, the fired signals from the at least one transmitter in the horizontal and the vertical array engaging the downhole formation;

receiving, using at least one receiver in the horizontal array, at least one first signal associated with the fired signal transmitted from the at least one transmitter in the horizontal array after the fired signal engages the downhole formation;

receiving, using at least one receiver in the vertical array, at least one second signal associated with the fired signal transmitted from the at least one transmitter in the vertical array after the fired signal engages the downhole formation, the at least one first and second received signals representing formation data and used to determine one or more vertical and horizontal formation parameters; and generating an image using the formation parameters.

2. The method of claim 1, wherein the vertical and horizontal formation parameters include one or more of attenuation and phase difference of the borehole formation.

3. The method of claim 1, wherein generating an image using the formation parameters includes generating an omni-directional image.

4. The method of claim 1, wherein engaging the downhole formation comprises penetrating into the downhole formation.

5. The method of claim 1, wherein the at least one transmitter and the at least one receiver is filled with a non-conducting filler.

6. The method of claim 1, wherein at least one of the at least one transmitters and receivers in the horizontal and vertical arrays include horn antennas.

7. The method of claim 1, wherein at least one of the at least one transmitter and receiver in the horizontal and vertical arrays has a curved shape.

8. The method of claim 1, wherein a first pair of the transmitters and a first pair of the receivers are oriented in the vertical array, and wherein a second pair of the transmitters and a second pair of the receivers are oriented in the horizontal array.

9. The method of claim 8, wherein the transmitters comprise a third pair of additional transmitters oriented in the vertical array outside the first pair, and wherein the transmitters in the first pair are paired as receivers with the additional transmitters of the third pair.

10. The method of claim 8, wherein at least the first and second pairs of the transmitters are curvilinear defining an outer circumference about the receivers.

11. The method of claim 10, wherein the first and second pairs of the receivers are curvilinear defining an inner circumference inside the outer circumference of the transmitters.

12. A downhole apparatus, comprising:
a downhole tool having a cylindrical body, the cylindrical body having a plurality of transmitters and receivers disposed within, the transmitters and receivers oriented in a vertical and a horizontal array, the transmitters having an enlarged aperture, the receivers being compactly disposed, and the transmitters being disposed around the receivers;
wherein when the downhole tool is disposed downhole, the downhole tool uses at least one transmitter in each of the vertical and horizontal arrays to fire a signal in the direction of the downhole formation;
wherein signals associated with the fired signals are received using at least one receiver in each of the vertical and horizontal arrays, after the fired signals engage the downhole formation;
wherein the received signals represent formation data and are used to determine one or more vertical and horizontal formation parameters; and
wherein an image is generated based on the formation parameters.

13. The apparatus of claim 12, wherein the vertical and horizontal formation parameters include one or more of attenuation and phase difference of the borehole formation.

14. The apparatus of claim 12, wherein the generated image is an omni-directional image.

15. The apparatus of claim 12, wherein engaging the downhole formation comprises penetrating into the downhole formation.

16. The apparatus of claim 12, wherein the plurality of transmitters and receivers include horn antennas.

17. The apparatus of claim 12, wherein at least one of the plurality of transmitters and receivers has a curved shape.

18. The apparatus of claim 12, wherein a first pair of the transmitters and a first pair of the receivers are oriented in the vertical array, and wherein a second pair of the transmitters and a second pair of the receivers are oriented in the horizontal array.

19. The apparatus of claim 18, wherein the transmitters comprise a third pair of additional transmitters oriented in the vertical array outside the first pair, and wherein the transmitters in the first pair are paired as receivers with the additional transmitters of the third pair.

20. The apparatus of claim 18, wherein at least the first and second pairs of the transmitters are curvilinear defining an outer circumference about the receivers.

21. The apparatus of claim 20, wherein the first and second pairs of the receivers are curvilinear defining an inner circumference inside the outer circumference of the transmitters.

22. A downhole apparatus, comprising:
a downhole tool having a cylindrical body, the cylindrical body having a plurality of transmitters and receivers disposed within, the transmitters and receivers oriented in a vertical and a horizontal array, the transmitters having an enlarged aperture relative to the receivers, and wherein the transmitters are disposed around the receivers;
wherein, when the downhole tool is disposed in a borehole, at least one transmitter in either the vertical or horizontal array is used to fire at least one signal in the direction of a downhole formation;
wherein at least one signal associated with the at least one fired signal is received using at least one receiver in the vertical or horizontal array, after the at least one fired signals engage the downhole formation; and
wherein the at least one received signals represents quantitative formation data and is used to determine one or more vertical or horizontal quantitative formation parameters.

23. The apparatus of claim 22, wherein the one or more vertical and horizontal quantitative formation parameters include one or more of attenuation and phase difference of the borehole formation.

24. The apparatus of claim 22, wherein the vertical or horizontal quantitative formation parameters further include one or more of resistivity and dielectric constant of the borehole formation.

25. The apparatus of claim 22, wherein the at least one receivers may be used as a transmitter used for generating an image.

26. The apparatus of claim 22, wherein engaging the downhole formation comprises penetrating into the downhole formation.

27. The apparatus of claim 22, wherein at least one of the plurality of transmitters and receivers include horn antennas.

28. The apparatus of claim 22, wherein at least one of the plurality of transmitters and receivers has a curved design.

29. The apparatus of claim 22, wherein a first pair of the transmitters and a first pair of the receivers are oriented in the vertical array, and wherein a second pair of the transmitters and a second pair of the receivers are oriented in the horizontal array.

30. The apparatus of claim 29, wherein the transmitters comprise a third pair of additional transmitters oriented in the vertical array outside the first pair, and wherein the transmitters in the first pair are paired as receivers with the additional transmitters of the third pair.

31. The apparatus of claim 29, wherein at least the first and second pairs of the transmitters are curvilinear defining an outer circumference about the receivers.

32. The apparatus of claim 31, wherein the first and second pairs of the receivers are curvilinear defining an inner circumference inside the outer circumference of the transmitters.

* * * * *